United States Patent [19]

Brooks

[11] Patent Number: 4,610,906

[45] Date of Patent: Sep. 9, 1986

[54] CARPET SEAMING TAPES WITH TWO METAL FOIL LAYERS

[75] Inventor: Ronald H. Brooks, Chelsea, Australia

[73] Assignee: Brooks Electrofoil Seaming Systems Pty. Ltd., Burwood, Australia

[21] Appl. No.: 692,884

[22] PCT Filed: May 7, 1984

[86] PCT No.: PCT/AU84/00077

§ 371 Date: Dec. 26, 1984

§ 102(e) Date: Dec. 26, 1984

[87] PCT Pub. No.: WO84/04646

PCT Pub. Date: Nov. 22, 1984

[30] Foreign Application Priority Data

May 6, 1983 [AU] Australia .............................. PF9204

[51] Int. Cl.[4] .............................................. H05B 3/16

[52] U.S. Cl. ...................................... 428/102; 428/62; 428/191; 428/200; 428/247; 428/294; 428/346; 428/464

[58] Field of Search ................. 428/62, 102, 200, 191, 428/247, 294, 346, 464

[56] References Cited

U.S. PATENT DOCUMENTS 4,483,896 11/1984 Gray et al. .......................... 428/200

FOREIGN PATENT DOCUMENTS 1282418 7/1972 United Kingdom ................ 428/259

*Primary Examiner*—Marion C. McCamish
*Attorney, Agent, or Firm*—Shlesinger Arkwright Garvey & Fado

[57] ABSTRACT

A carpet joining tape comprises two strips of metal foil (13, 16) which overlie each other and are separated by an electrically insulating material (14), such as a paper strip. The superimposed metal foil strips (13, 16) and interposed electrical insulating material (14) are secured together so that an electric current can be passed through both strips (13, 16) in series to resistively heat the strips (13, 16) so as to melt a heat softenable, carpet bonding adhesive (19). The metal foil strips (13, 16) and electrical insulating material (14) may be secured together and to a base insulating strip (11) beneath the lower foil strip (13) and to reinforcing material (18) on the upper metal foil strip (16) by lines of stitching (21), and a layer of carpet bonding, heat softenable adhesive material (19) is disposed on the upper surface of the upper metal foil strip (16) and reinforcing material (18).

14 Claims, 2 Drawing Figures

10 11 21 19 16 18 21 13 14

CARPET SEAMING TAPES WITH TWO METAL FOIL LAYERS

BACKGROUND OF THE INVENTION

This invention relates to improvements in carpet seaming tapes and relates particularly to an improved form of tape particularly useful for joining edge portions of carpet or similar material and for removing joining tape from previously seamed material.

BACKGROUND ART

Various forms of carpet joining tape are well known. One form of tape comprises a strip of metal foil with a ribbon or layer of heat softenable adhesive thereon and preferably also including a reinforcing material such as woven textile material or the like. The adhesive is softened by the application of heat and an adhesive bond is thereby formed between the tape and the underside of a carpet material to which the tape is applied.

Another form of carpet joining tape is known in which a strip of Kraft paper or similar material is used as a backing, the paper, metal foil and reinforcing material being secured together either by the heat softenable adhesive or by other means such as sewing.

In the use of such carpet joining tapes, it is known to pass an electric current along the metal foil to generate heat therein which melts the adhesive to enable the tape to be adhered to the carpet backing of the carpet pieces to be joined. However, a relatively high current is required to be passed through the foil to generate sufficient heat to melt the adhesive, and when the seam to be made is relatively long thus requiring a relatively long length of tape, it is necessary to utilize at least one relatively long lead to enable the current source to be connected to both ends of the metal foil strip.

It is therefore desirable to provide an improved carpet joining tape which avoids or at least minimizes difficulties associated with the known carpet joining tapes.

It has been proposed to provide a "split foil" tape as described in Australian Patent Application No. 57288/80 wherein the metal foil strip running the length of the tape is longitudinally divided into two or more separated strips extending along the length of the tape. With such an arrangement, it is proposed that a bridging connection is made ar one end of the tape and the electrical connections are provided at the other end of the tape thus obviationg the need for relatively long current leads. However, with such a construction of tape, the metal foil required to carry the necessary current to provide sufficient heating to melt the adhesive is relatively thick and, therefore, relatively expensive. Further, difficulties have arisen in producing such a tape and in ensuring that the two foil strips which are separated from each other across the width of the tape remain so separated and do not short together midway along the length of the tape and are not bridged by any material which may provide an alternative current path.

SUMMARY OF THE INVENTION

The present invention provides an improved construction of carpet joining tape in which the difficulties associated with the "split foil" tape are removed.

According to the invention there is provided a carpet joining tape comprising first and second strips of metal foil overlying each other and separated by an electrical insulating material, said strrps and insulating material being secured together and each strip having a cross-sectional area which enables an electrical current to pass therethrough to generate heat therein whereby the combined heat from both foil strips is sufficient to melt a carpet joining heat softenable adhesive composition.

In one preferred form of the invention, the metal foil strips are secured to a base strip of an insulating material, such as crepe Kraft paper, which acts as a heat insulator to thereby minimize heat loss from the lower foil strip when the tape is in use.

The improved tape of the invention may be used solely as a heating element which may be placed beneath a previously formed seam comprising a carpet joining tape adhered in position under the abutting carpet edges forming the seam to thereby remelt the adhesive on that carpet tape to allow adjustment of the seam or removal of the carpet joining tape.

In another form of the invention, the improved tape of the invention further includes reinforcing material on the upper foil strip and one or more ribbons or a layer of heat softenable adhesive material. With this form of the invention, the reinforcing material may comprise fibreglass reinforcing threads or synthetic or natural textile materials, threads, webs or scrim which may or may not also incorporate fibreglass threads or filaments.

It is preferred that the backing material, strips of metal foil and electrical insulating material, and the reinforcing material are secured together by sewing. Preferably, the lines of stitching are along the outer edges of the tape, outwardly of the outer edges of the first and/or second metal foil strips.

The strip of electrical insulating material may be any suitable electrical insulator which will retain its integrity notwithstanding relatively rough handling of the tape, and will therefore act to prevent the first and second strips of metal foil contacting each other or being otherwise bridged except by an appropriate bridging clamp which is used at one end of the tape to connect the metal foil stirps together. In one form of tape according to the invention, the electrical insulating material comprises a strip of paper, such as Kraft paper, secured between the metal foil strips. In another form, the electrical insulating material comprises a strip of thermoplastic material.

In order that the invention is more readily understood, one embodiment thereof will now be described with reference to the accompanying drawings.

DESCRIPTION OF THE PREFERRED EMBODIMENT

Figure 1:
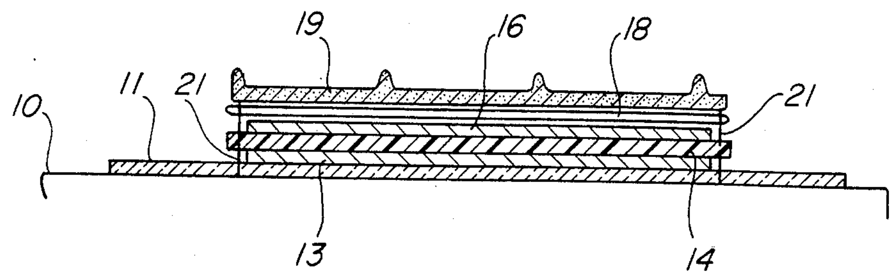
FIG. 1 is a cross-sectional elevational view of a tape formed in accordance with the invention.
Figure 2:
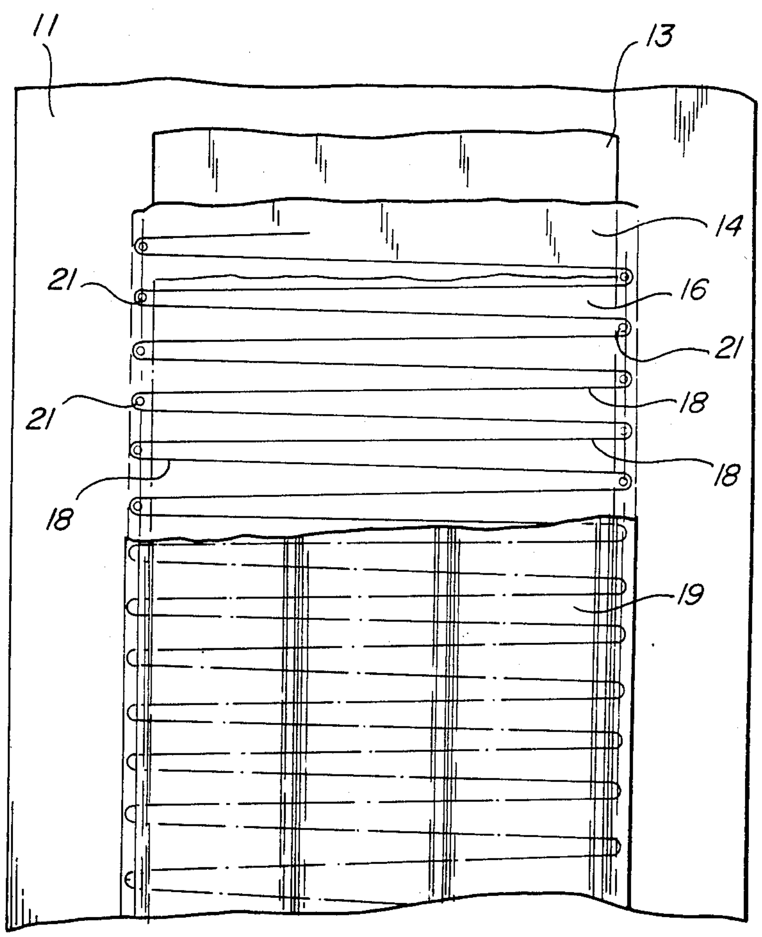
FIG. 2 is a plan view of the tape of FIG. 1.

Referring to FIGS. 1 and 2, there is shown a carpet joining tape which comprises a backing strip 11 formed of crepe Kraft paper and which provides an effective heat insulating medium to restrict heat losses from the tape onto the supporting surface 10 with which the tape is engaged in use. The backing strip 11 preferably has a width of approximately 90 mm, although it will be appreciated that the width of the backing strip 11 may be varied to produce tapes of any desired width.

A first strip 13 of an electrically conducting metal foil is superimposed on the backing strip 11. The first foil strip 13 has a width of approximately 50 mm and is located substantially centrally along the backing strip 11. The foil thickness is approximately 25 microns.

A strip of electrically insulating material 14 overlies the first foil strip 13. The electrically insulating material may comprise a strip of Kraft or other paper or the like or, in an alternative arrangement, the upper surface of the first foil strip 13 may be coated with a synthetic plastic or resinous insulating material, varnish or the like. Many electrically insulating materials may be used and those skilled in the art will have no difficulty in selecting an appropriate material.

A second strip 16 of metal foil is carried on the electrically insulating material, the seoond foil strip 16 having dimensions similar to that of the first foil strip 13. The electrically insulating material 14 may have a width greater than that of the foil strips 13 and 16.

A reinforcing material 18 is disposed on the upper surface of the second foil strip 16 and a layer of heat softenable adhesive material 19 forms the upper surface of the carpet joining tape. The reinforcing material 18 is preferably one or more threads or filaments of a synthetic or natural material such as Rayon, Nylon, fibreglass, cotton and the like, or any combination thereof, the threads or filaments extending across the tape. If desired, the reinforcing material 18 may consist of woven or felted textile material, or scrim or fibreglass mat or the like. The type and nature of the reinforcing material must be such as to be bonded to abutting edges of the carpet to be seamed to support those edges in abutting relationship.

The heat softenable adhesive 19, many of which are known in the art, is preferably applied as a layer to substantially cover the upper surface of the second foil strip 16 and the reinforcing material 18. However, the adhesive may be applied as one or more longitudinally extending ribbons or beads or as individual beads or in a pattern or the like.

In the embodiment illustrated, the backing strip 11, first and second foil strips 13 and 16, insulating material 14 and reinforcing material 18 are secured together by lines of stitching 21 which extend longitudinally of the tape. The lines of stitching are arranged outwardly of the outer longitudinal edges of the first and second foil strips so that the needles of the sewing apparatus used do not puncture the foil strips. However, if desired, stitching through the foil may be carried out provided that appropriate care is taken to ensure that the holes produced by the needles do not result in the second foil strip 16 contacting the first foil strip 13. This may be done by ensuring that a sufficiently thick electrical insulating material is located between the respective foil strips In an alternative arrangement, the various layers of material may be held together by the adhesive 19 which can be applied so as to overlap the edges of the foil strips, the insulating material 14 and the reinforcing materral 18 and bond the various layers to the backing strip 11.

The tape of the present invention provides two separate electrically conducting foil strips which extend along the length of the tape. In use, a bridging clamp or wire or the like is used to connect the first and second foil strips together at one end of the length of carpet joining tape which is to be used to produce a carpet seam. The tape is used beneath the carpet seam, preferably in a manner similar to that described in my Australian Pat. No. 529,440, with the electric current supply being connected to the two foil strips 13 and 16 at the end thereof opposite that at which the bridging member is attached. The current flowing through the foil strips 13 and 16 generates heat therein which softens the heat softenable adhesive composition 19 to enable carpet seam to be formed in the manner described in my Australian Pat. No. 529,440 referred to above.

As heat is generated simultaneously in two superimposed foil strips, the current required is only that which will generate sufficient heat in each foil strip such that the combined heat is able to melt the adhesive 19. Thus, the required current can be substantially reduced as compared to that required with conventional tapes.

Where the tape is to be used as a heating source, the reinforcing filaments, threads or other forms of textile material and/or the adhesive may be omitted so that the tape constitutes an element to be used beneath a previously seamed join to enable the join to be reformed or taken apart.

Preferably, the metal foil is formed of an aluminium alloy, and may consist of a low temper alloy having the following composition:

0.1% silicon and iron
0.05% copper
0.05% manganese
0.1% zinc
0.05% titanium
up to 90% aluminium.

This alloy has an electrical resistance of approximately 1 to 5 ohms per 100 meters in a foil strip of 51 mm wide and 25 microns thickness.

I claim:

1. Carpet joining tape, comprising, a first strip of metal foil through which an electric current is passed to heat the foil, a second strip of metal foil which overlies the first metal foil strip and is separated therefrom by an electrical insulating material, said strips and insulating material being secured together and each said foil strip acting as an electrical resistive element and having a cross-sectional asrea such that an electrical current passes therethrough generates heat in the foil strip, the combined heat from both foil strips when electrically heated being sufficient to melt a carpet bonding, heat softenable adhesive composition.

2. A tape according to claim 1 characterised in that both metal foil strips and the electrical insulating layer are secured to a base strip of electrical and heat insulating material.

3. A tape according to claim 2 wherein said base strip comprises a strip of paper having a width greater than that of either of the metal foil strips.

4. A tape according to claim 3 wherein a reinforcing material is disposed on the second metal foil strip.

5. A tape according to claim 4 wherein a heat softenable adhesive is disposed on the second metal foil strip and the reinforcing material thereon.

6. A tape according to claim 5 wherein said heat softenable adhesive comprises a layer of adhesive materral having a transverse dimension at least equal to the width of the second metal foil strip.

7. A tape according to claim 5 wherein said heat softenable adhesive comprises a plurality of ribbons of adhesive material extending longitudinally of the tape.

8. A tape according to claim 4 wherein said reinforcing material comprises reinforcrng threads or filaments extending substantially transversely of the tape.

9. A tape according to claim 8 wherein said reinforcing material includes fibreglass threads or filaments.

10. A tape according to claim 4 wherein said reinforcing material comprises a woven web or scrim of textile material.

11. A tape according to claim 4 wherein the first and second metal foil strips and electrically insulating material are secured together by one or more lines of stitching extending longitudinally of the tape.

12. A tape according to claim 11 wherein said lines of stitching extend along outer edges of the tape outwardly of the outer longitudinal edges of the first and/or second metal foil strips.

13. A tape according to claim 4 wherein said electrically insulating material between the first and second metal foil strips aomprises a strip of paper material or thermoplastic material.

14. A tape according to claim 4 wherein said first and second metal foil strips each comprise a strip of aluminium foil having a width of approximately 50 mm and thickness of approximately 25 microns and a resistivity of between 1 and 5 ohms per 100 meter.

* * * * *